United States Patent Office 3,178,307
Patented Apr. 13, 1965

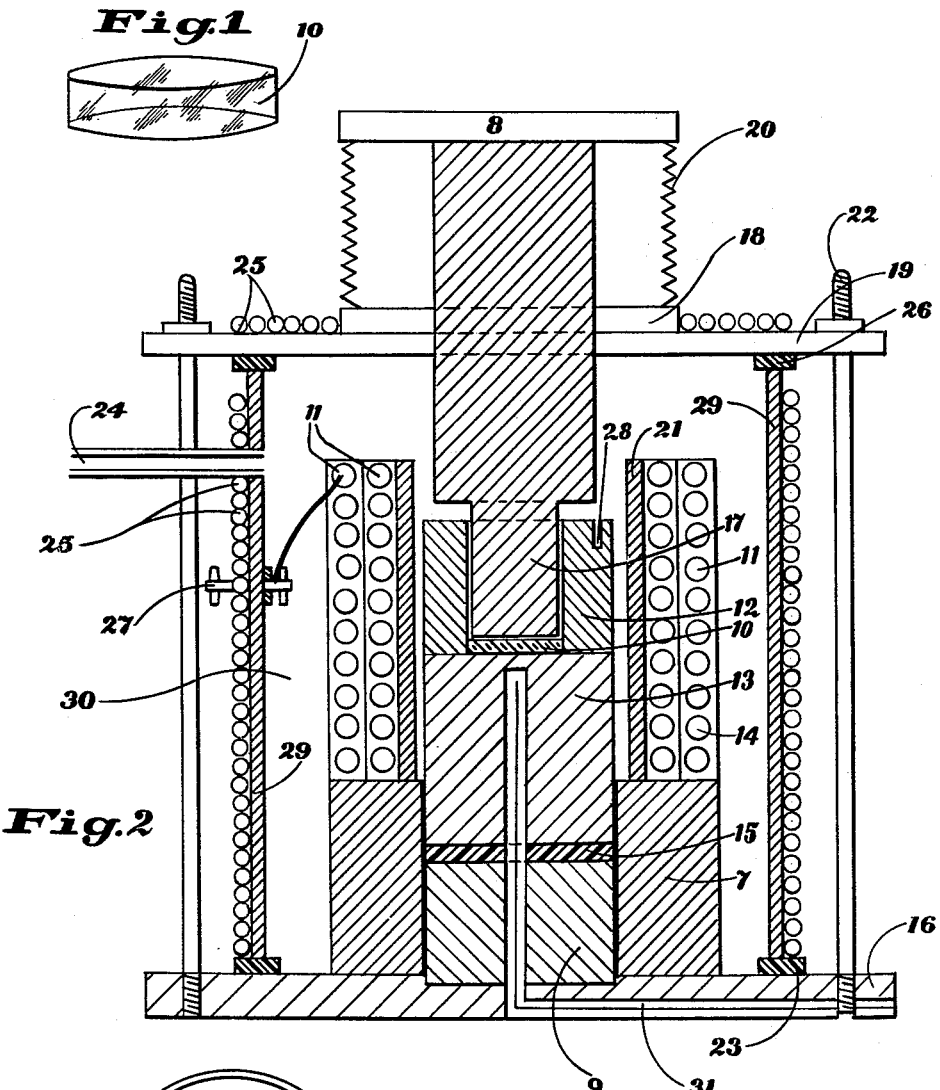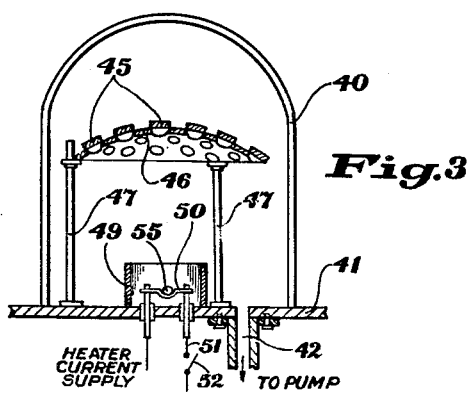

3,178,307
HOT MOLDED COMPACTS FOR USE IN VACUUM COATING OF OPTICAL INTERFERENCE FILMS AND METHOD OF PREPARING SUCH FILMS THEREFROM
Edward Carnall, Jr., and Paul B. Mauer, Rochester, N.Y., assignors to Eastman Kodak Company, Rochester, N.Y., a corporation of New Jersey
Original application Jan. 13, 1960, Ser. No. 2,299. Divided and this application Nov. 17, 1960, Ser. No. 69,964
2 Claims. (Cl. 117—66)

This invention relates to the coating of optical interference films by the evaporation of salts in a vacuum, and more particularly to novel hot molded compacts of metallic salts and to a process for forming optical interference films.

Heretofore, in such vacuum coating operations, metallic salts in the form of cold pressed pellets or powder have been employed. The metallic salts in these forms do not evaporate smoothly and thus cause crepitation or violent jumping about of the pellets or powder and the escape of the salts from the heating position before proper evaporation of the salts can take place in the vacuum chamber.

Metallic salt pellets having better evaporation characteristics as compared to the above-mentioned powder or pellets cold pressed from powder are described in U.S. Patent 2,301,456 of November 10, 1942. In this patent, a bead of the metallic fluoride is formed onto the filament to be heated by melting down in the filament a pellet compacted from the fluoride in powder form. The resulting pellet is hard and porous and is further described as being substantially free from closed chambers.

However, this porous structure tends to pick up moisture and the occasional closed chamber in the pellet holds air. The presence of moisture and air is productive of crepitation.

An object, therefore, of the present invention is to provide novel compacts of metallic salts which are more suitable for use in vacuum coating processes.

Another object is a method of forming metallic salt compacts which have substantially theoretical density.

Still another object is to provide compacts of magnesium fluoride, calcium fluoride, aluminum fluoride, thorium oxyfluoride and zinc sulfide which have substantially theoretical density.

Other objects will appear hereinafter.

In accordance with this invention, these and other objects are attained by hot pressing a powder of the selected metallic salt into a homogeneous body of substantially theoretical density. Suitable materials to employ in our process are magnesium fluoride, calcium fluoride, aluminum fluoride, zinc sulfide, and thorium oxyfluoride.

The metallic salt powder is heated in a mold of the desired shape to such a temperature and pressure combination that the resultant plastic flow causes the salt to compress to substantially theoretical density.

The hot molded compact is then cooled to atmospheric temperatures. The resulting hot moldled compact is a dense, homogeneous solid which is then subdivided into particles of a desired shape.

The invention is fully described in the following detailed description and accompanying drawings in which:

FIG. 1 is a representation of a compact made in accordance with the invention;

FIG. 2 is an elevational view partly in section of molding apparatus suitable for molding a selected powdered metallic salt under heat, pressure and vacuum into a homogeneous solid.

FIG. 3 is an elevation in cross-section of suitable apparatus for coating materials by evaporation.

Apparatus suitable for molding metallic salt compacts in accordance with the present invention is shown in FIG. 2. The apparatus comprises a base 16, a silicone gasket 23, a block 9, a thermal insulator 15, a block 13, a molding cylinder 12, a molding plunger 17 having a head 8 which is adapted to be attached to a prime mover, not shown, such as the piston of a hydraulic press to move the plunger 17 vertically into and out of molding cylinder 12 and thereby press the metallic salt powder into a solid compact shown at 10.

The head is attached to aligning ring 18 by metal bellows 20 thereby assuring a vacuum seal around the upper portion of the plunger 17.

A cylinder 21 encloses the molding cylinder 12 and plunger 17 and is supported on block 7. A heating unit 14 comprises a refractory casing which is positioned around cylinder 21 and is also supported on block 7 and contains heating coils 11, the terminals for which are shown at 27. A cylinder 29 is concentrically positioned in respect to cylinder 21 and forms a vacuum chamber 30, the ends of which are closed by gaskets 23 and 26 and plates 16 and 19. Cooling coils 25 are positioned in contact with the outer surface of cylinder 29. A conduit 24 connects the vacuum chamber 30 to a suitable vacuum system, not shown. The assembly is further secured by the coaction of top plate 19 and threaded rods 22 and base plate 16.

The temperature is measured by either one or both of thermocouples 28 and 31 which are suitably located in channels respectively positioned adjacent the molding position.

The blocks 9, 13 and cylinder 12 may be made of molybdenum alloy, Nichrome or stainless steel. Plunger 17, cylinder 12 and block 13 must all be resistant at high temperatures. Nichrome, graphite, molybdenum, tungsten and super-alloys are satisfactory for these members.

The preferred operation of the device is as follows: The selected powder to be molded is placed in the molding cylinder 12 beneath plunger 17 and the apparatus is assembled as shown in FIG. 2. The powder may advantageously be first cold pressed. In this operation, a pressure of 5000 pounds per square inch is exerted by the plunger 17 on the powder for a few minutes to compact the powder into a firm compact. The plunger is then removed and any excess or loose powder is removed by the operator. This cold pressing operation serves to form a level charge and prevents powder from lodging between the plunger 17 and the wall of cylinder 12 during the subsequent molding step. The cold pressing of the powder also enables the resulting compact to heat more easily since heat is conducted through the compact more efficiently than through unpressed powder.

However, suitable molded pieces can be made by omitting the above-described preliminary cold pressing step and using only the hot molding procedures now described.

The molding apparatus is again assembled as shown in FIG. 2 and is now attached to a suitable vacuum system, not shown, by means of pipe 24 and chamber 30 is then evacuated to 0.2 mm. to $1 \times 10^{-5}$ mm. of mercury. Cooling water is circulated through the cooling coils 25 from a source, not shown, and electric current is supplied to the heater coils 11 through leads 27. The temperature of the mold is monitored by means of platinum-rhodium thermocouples 28 and 31. When the temperature reaches the desired range, molding force is applied to the head 8 of plunger 17 by a hydraulic press, not shown, and over a five-minute period or less, pressure is built up to the desired pressure.

The pressure on the powder is maintained for from 10 to 60 minutes while the temperature is held constant. During the heating-up period, the equipment gases off and the vacuum falls to approximately 0.5 mm. but gradually recovers to the .2 mm. range as the adsorbed gases are driven off and expelled.

At the end of the pressing period, the electric power is shut off, the pressure is released over a period of a few seconds to several minutes and the apparatus allowed to cool.

After a period of approximately 30 minutes, the temperature of cylinder 12 will fall to approximately 205° C. and the bolts 22 are removed and the plunger assembly and cylinder 12 and 21 are removed, leaving the molded magnesium fluoride unit resting on block 13. The molded piece is permitted to cool to room temperature, i.e. 22° C. This product is a polycrystalline solid.

It is then removed from the apparatus and subdivided into units suitable for use in vacuum coating processes.

Suitable apparatus for use in vacuum coating the compacts of the present invention is shown in FIG. 3. In this figure, bell jar 40 rests on base 41 and is evacuated in the usual way through an outlet 42 by vacuum pumps. In the near vacuum thus created, optical elements 45 are carried on a perforated concave support 46 supported by upright rods 47. The optical elements 45 are adjacent to the perforations in the concave plate 46 to receive material evaporated upward from an electrically heated boat 50. The boat is preferably a simple dimple in a ribbon of tungsten. The heater current for the boat 50 is provided through wires 51 and is turned off or on by a switch 52. In actual practice, a variable transformer is used instead of the switch 52 for controlling the heater current but a simple switch is shown to simplify the description.

In the arrangement shown, the selected compact 55 is supported in the boat 50 equidistant from the optical elements 45. A cylindrical metal shield 49 protects the sides of the bell jar 40 from being coated by the evaporating compact. A pressure of about $8 \times 10^{-5}$ mm. Hg is suitable for coating in this apparatus. Because the selected compact is a dense, homogeneous solid, no spattering of the coating occurs and a smooth, even coating on the optical elements results.

The invention is further described in the following examples.

*Example 1*

Optical grade magnesium fluoride powder was placed in a mold and a plunger which is adapted to reciprocate into and out of the cavity was pressed against the powder. The powder is heated to 800° C. and pressed at a pressure within the range of 15,000 to 25,000 pounds per square inch until slumping or the compression of the powder ceases. The heating and pressing is carried out under a vacuum of 0.5 mm. of mercury. Coatings made from hot pressed magnesium fluoride in the apparatus of FIG. 3 have good stability to environmental tests.

*Example 2*

Aluminum fluoride powder was similarly hot pressed into a disc by the general procedure outlined in Example 1. The powder was heated to 550° C. and pressed at 15,000 to 20,000 pounds per square inch, and under a vacuum of 0.5 mm. until the compression ceases. The pressure is then released and the material is allowed to cool to atmospheric temperatures. The hot pressed aluminum fluoride pellets sublime smoothly in the above-described vacuum-coating process without any crepitation being noted.

*Example 3*

Zinc sulfide was placed in a mold under a vacuum of 0.5 mm. was heated as rapidly as possible to 800° C. and a pressure of 15,000 to 30,000 pounds per square inch until compression ceases and then the pressure is released and the zinc sulfide is permitted to cool to atmospheric temperatures. No spattering of the pellets occured when they were employed in the above-described vacuum-coating processes.

*Example 4*

The procedure of Example 1 was repeated with each of the following metallic salts: calcium fluoride, barium fluoride and thorium oxyfluoride. No spattering was experienced when these pellets were employed in vacuum coating processes such as are described above. The temperature and pressure combination at which the hot pressing is carried out may be varied somewhat. It is necessary that the combination produce plastic flow in the salt powder such that near theoretical density results.

For most compounds 7½ to 15 tons per square inch is sufficient. The pressure may be applied either throughout the entire heating and cooling cycle or only after the mold has reached the pressing temperature and again released after the compression has ceased.

The vacuum should be maintained at about 0.5 mm. mercury, or less, during heating and pressing.

The powder size is not too critical, 20 mesh and finer being suitable. However, it is noted that the compacts having densities closest to theoretical evaporate most smoothly and in order to reach maximum densities, the powder size should be 150 mesh or finer.

The improvement in vacuum coating when employing hot pressed solid metallic salt pellets made in accordance with the present invention appears due in part to the fact that because they are substantially theoretical density, they contain no dissolved gases. Also during the hot pressing operation, the individual crystals in the salt are brought into intimate contact with each other and the resulting solid behaves as a massive crystal. Hence, the thermal conductivity of the hot pressed material is far superior to that of cold pressed pellets.

This invention, therefore, makes available coating materials which are otherwise nearly impossible to use in vacuum coating processes as well as improving the coatings made from commonly employed metallic salts.

This application is a division of our copending application Serial No. 2,299, filed January 13, 1960, entitled "Hot Molded Compacts for Use in Vacuum Coating of Optical Interference Films and Method of Preparing Such Films Therefrom."

We claim:

1. In a process of vaporizing metallic salts in a vacuum to coat a surface therewith, the step which consists in vaporizing a hot molded metallic salt compact which has substantially theoretical density.

2. The process of claim 1 in which the composition of the compact is one selected from the class consisting of magnesium fluoride, aluminum fluoride, barium fluoride, thorium oxyfluoride and zinc sulfide.

References Cited by the Examiner

UNITED STATES PATENTS 2,301,456   11/42   Sabine _____ 117—66

RICHARD D. NEVIUS, *Primary Examiner.*

JOSEPH B. SPENCER, *Examiner.*